(12) United States Patent
Prakash et al.

(10) Patent No.: US 9,021,446 B2
(45) Date of Patent: Apr. 28, 2015

(54) UNCOVERAGE TOOL

(75) Inventors: Raj Prakash, Saratoga, CA (US); Chester M. Wood, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 1998 days.

(21) Appl. No.: 11/427,259

(22) Filed: Jun. 28, 2006

(65) Prior Publication Data

US 2008/0022262 A1 Jan. 24, 2008

(51) Int. Cl.
G06F 9/44 (2006.01)
G06F 11/36 (2006.01)

(52) U.S. Cl.
CPC .................................. G06F 11/3676 (2013.01)

(58) Field of Classification Search
None
See application file for complete search history.

(56) References Cited

U.S. PATENT DOCUMENTS

| | | | | |
|---|---|---|---|---|
| 5,784,553 A | * | 7/1998 | Kolawa et al. | 714/38 |
| 5,933,640 A | * | 8/1999 | Dion | 717/132 |
| 6,671,876 B1 | * | 12/2003 | Podowski | 717/130 |
| 6,959,431 B1 | * | 10/2005 | Shiels et al. | 717/124 |
| 7,165,074 B2 | * | 1/2007 | Avvari et al. | 1/1 |
| 2003/0212924 A1 | * | 11/2003 | Avvari et al. | 714/38 |
| 2003/0229889 A1 | * | 12/2003 | Kuzmin et al. | 717/130 |
| 2004/0117760 A1 | * | 6/2004 | McFarling | 717/101 |

* cited by examiner

*Primary Examiner* — Don Wong
*Assistant Examiner* — Deric Ortiz
(74) *Attorney, Agent, or Firm* — Polsinelli PC

(57) ABSTRACT

Indication of uncoverage information allows tests to be tailored to target those uncovered code units with the most potential to increase coverage of a program. A tool examines coverage information of a program to identify code units of the program that were not covered by test data used to exercise the program. The tool also examines structural information (e.g., control flow) for the program to identify those of the uncovered code units that have direct control flow from a corresponding covered code unit ("root level uncovered code units"). The coverage tool then measures potential impact on coverage for each of the root level uncovered code units.

16 Claims, 10 Drawing Sheets

```
int COMPUTE_POTENTIAL (vertex_struct *VERTEX)
```

| |
|---|
| VERTEX.visited = 1 |
| IF VERTEX.potential_coverage THEN RETURN (VERTEX.potential_coverage) |
| child_total = 0 |
| num = VERTEX.num_direct_children |
| WHILE num > 0 AND !VERTEX.potential_coverage |
|     current_vertex = VERTEX.child[num-1] |
|     IF !current_vertex.visited THEN |
|     child_total += (COMPUTE_POTENTIAL(current_vertex)) |
|     --num |
| VERTEX.potential_coverage = VERTEX.individual_value + child_total |
| RETURN (VERTEX.potential_coverage) |

FIG. 4

UNCOVERAGE TOOL

BACKGROUND

1. Field of the Invention

The invention generally relates to code analysis, and, more particularly, to uncoverage analysis of code.

2. Description of the Related Art

Software Quality Engineering groups evaluate their work on the basis of "code coverage" metrics which are one way of describing how effectively the target program is being tested. Typical numbers such as "80% coverage" are reported, which indicate how much of the code in the target program is actually being exercised by the test suite. Although useful as a relative progress indicator, such numbers do not provide meaningful clues on how to increase coverage.

Various code coverage measurement tools exist, such as tcov(1). Coverage tools are essentially profilers that capture data on code run with test suites. The coverage tools indicate which portions of the code are executed, so implicitly indicate which portions of code are not covered. Code coverage tools generally work by instrumenting the code somewhere in the compilation process. Conventional code coverage tools can produce overall coverage percentage reports. Conventional code coverage tools may also mark up the source code to indicate which basic blocks and/or functions are covered or not covered.

However, since these tools do not generally have access to the whole program view, they cannot reliably detect the structure of uncovered code, and thus cannot provide full information on the extent of uncovered code guarded by any particular function.

SUMMARY

It has been discovered that structural information and coverage information for a program can be examined to derive uncoverage information about a code. The uncoverage information provides guidance for developing test data for increasing coverage without the inefficient and onerous task of manual examination. A coverage tool examines structural information of a program and coverage information of the program to identify root level uncovered code units. The potential coverage values for these root level uncovered code units are computed and indicated. A potential coverage value conveys the potential increase in coverage that can be attained if the corresponding root level uncovered code unit is exercised by a test. The indicated potential coverage values (or uncoverage values) are ordered by degree of potential impact to coverage analysis. Ordering the uncovered code units by the potential increase in coverage possible if the code units are covered allows for efficient targeting of code units for coverage analysis.

BRIEF DESCRIPTION OF THE DRAWINGS

The present invention may be better understood, and its numerous objects, features, and advantages made apparent to those skilled in the art by referencing the accompanying drawings.

FIG. 4 depicts a flow for an example function to compute potential coverage values.

FIG. 8A depicts an example representation of control flow that illustrates coverage corresponding to the display depicted in FIG. 5. FIG. 8B depicts an example control flow and increased coverage that corresponds to the display depicted in FIG. 6.

The use of the same reference symbols in different drawings indicates similar or identical items.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. For instance, although examples refer to searching techniques for identifying particular vertices in a graph representation, embodiments are not limited to any particular technique and may instead or in addition utilize an indexing technique for visiting vertices of a graph representation, or employ other techniques for organizing information and searching the organized information. In other instances, well-known instruction instances, protocols, structures and techniques have not been shown in detail in order not to obfuscate the description.

Figure 1:
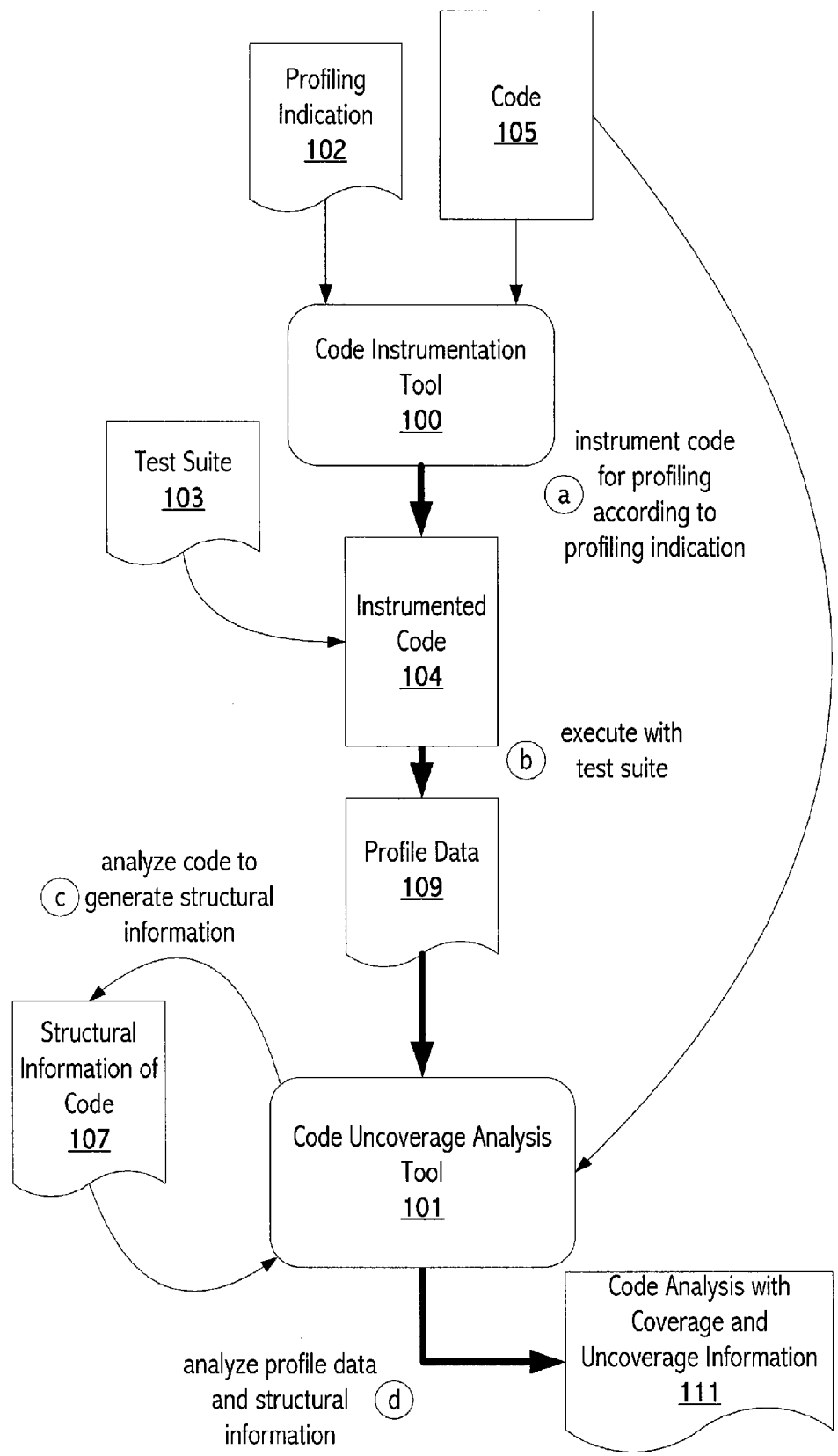
FIG. 1 depicts example code analysis tool.

FIG. 1 depicts example tools for code analysis. In FIG. 1, a code instrumentation tool 100 receives as input a code 105 and a profiling indication 102 (e.g., command line options to the instrumentation tool). For example, the profiling indication 102 may be indication of where to store profile data, although not a required option. The code instrumentation tool 100 instruments the code 105 according to the profiling indication 102. The code instrumentation tool 100 outputs instrumented code 104. The instrumented code 104 is executed with a test suite 103 to generate profile data 109. The code may be executed by a tool with the test suite (e.g., path to the test suite is indicated to a tool, the test suite 103 is input into the tool 101, etc.), separate from a tool, etc. A code uncoverage analysis tool 101 receives as input the code 105. The code uncoverage analysis tool 101 analyzes the code 105 to generate structural information 107 (e.g., control flow graph). The code uncoverage analysis tool 101 analyzes the profile data 109 for coverage information. The code analysis tool 101 also analyzes the structural information 107 with the coverage information to yield uncoverage information. Based on the analysis, the code analysis tool 101 generates code analysis 111. The code analysis 111 includes both coverage and uncoverage information. Uncoverage information indicates coverage values for uncovered code units potentially achievable if those uncovered code units were exercised by a test suite (i.e., potential coverage values). The depicted tools are meant to aid in understanding the described embodiments, and not meant to be limiting. Those of ordinary skill in the art should appreciate that functionality may be implemented in various manners. For example, a single tool may be realized that instruments code, executes the instrumented code with one or more test suites, and performs analysis to generate the code analysis information with both code coverage and uncoverage information. At the other end of the spectrum, multiple tools may be realized, each performing a particular function. For example, instrumentation, code execution, structural information generation, coverage analysis, and uncoverage analysis may each be performed by a separate tool.

Figure 2:
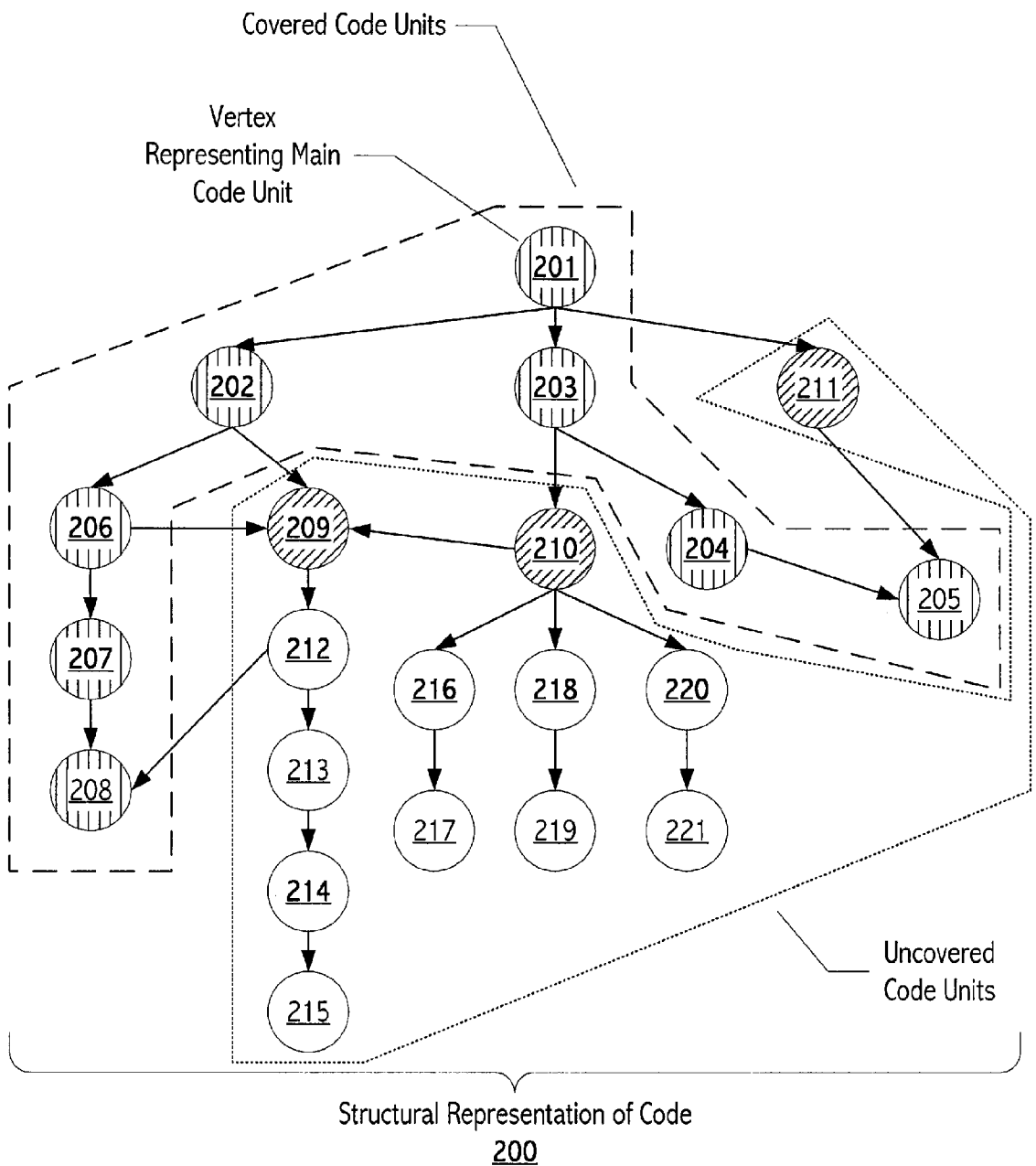
FIG. 2 depicts an example structural representation of code.

FIG. 2 depicts an example structural representation of code. A structural representation 200 of code includes vertices 201-221. Examples of a structural representation for code include a call graph, control flow graph, etc. Those of ordinary skill in the art will appreciate that a structural representation may be implemented with any of a number of one or more data structures (e.g., hash table, linked lists, trees, tries, arrays of linked lists, arrays of trees, hash table of trees, etc.). Each of the vertices in the structural representation 200 represents a code unit. A code unit may be realized as a subroutine, subprogram, function, method, procedure, basic block, etc. When a program is executed with test data (e.g., the test suite), every code unit of the program is not necessarily covered (i.e., some code units are not executed). In the context of functions and function calls, covered code units are those functions that are called during execution of the program with the test suite, and uncovered code units are those functions that are not called during execution of the program with the test suite. The vertices 201-208 of the structural representation 200 represent covered code units. The vertices 209-221 represent code units that are uncovered. The vertices 209-211 represent uncovered code units that have direct control flow from covered code units (hereinafter referred to as "root level uncovered code units"). Although control flow may be described in different terms with respect to particular realizations (flow between basic blocks, functions calls, etc.), control flow generally indicates an avenue for control to transition between code units. Structure of a program or structural information for a program generally refers to both potential control flow and actual control flow, since the two may vary with different inputs. Therefore control flow is used herein to refer to both actual control flow and potential control flow. The code units represented by the vertices 212-221 are non-root level uncovered code units (i.e., uncovered code units having direct or indirect control flow from an uncovered code unit and no direct control flow from a covered code unit, sometimes referred to as child uncovered code unit). Although not depicted, uncovered code units that are not called by any other code units, covered or uncovered, are also considered root level.

In FIG. 2, control flows between the vertices as follows:
201→{202, 203, 211}
202→{206, 209}; 203→{204, 210}; 211→205
206→{207, 209}; 209→212; 210→{216, 218, 220};
204→205
207→208; 212→{208, 213}; 216→217; 218→219;
220→221
213→214→215

Figure 3:
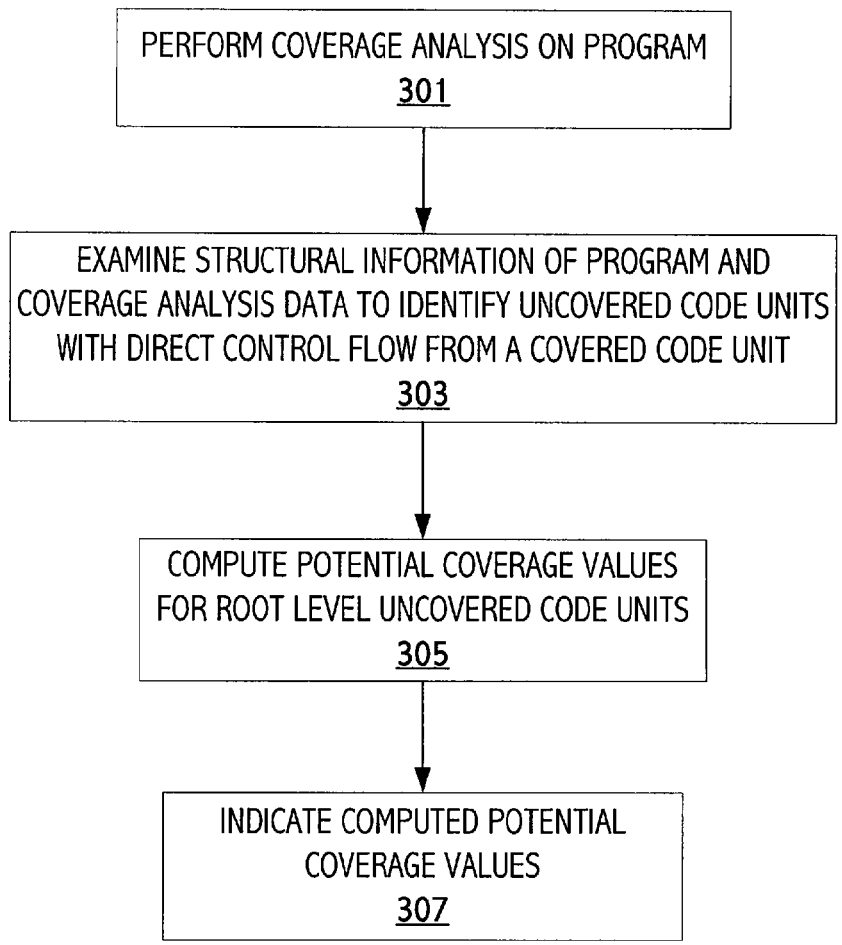
FIG. 3 depicts example an example flowchart for uncoverage analysis.

FIG. 3 depicts example an example flowchart for uncoverage analysis. At block 301 coverage analysis is performed on a program. At block 303, the structural information of the program and coverage analysis data for the program are examined to identify uncovered code units with direct control flow from one or more covered code units (i.e., root level uncovered code units). For example, a code analysis tool examines the structural representation 200 to identify the root level uncovered code units represented by the vertices 209-211 in FIG. 2. At block 305, potential coverage values for the root level uncovered code units are computed. Potential coverage values for non-root level uncovered code units may also be computed. At block 307, the computed potential coverage values are indicated (e.g., the values are displayed, stored in one or more structures, stored and sorted, transmitted, etc.).

Various techniques may be employed to identify root level uncovered code units and compute potential coverage values. For example, structural information may be indicated in a representation of a graph, such as a call graph or control flow graph. The call graph may be extracted from an executable file (e.g., extracted from a special section of a binary file), generated from an executable file, etc. Furthermore, a single graph representation may be maintained or generated for the program, separate graph representations may be generated for each root level uncovered code unit, etc. A graph representation is then traversed to classify vertices as representing covered, root level uncovered, or non-root level uncovered code units according to coverage analysis data and control flow.

Figure 9:
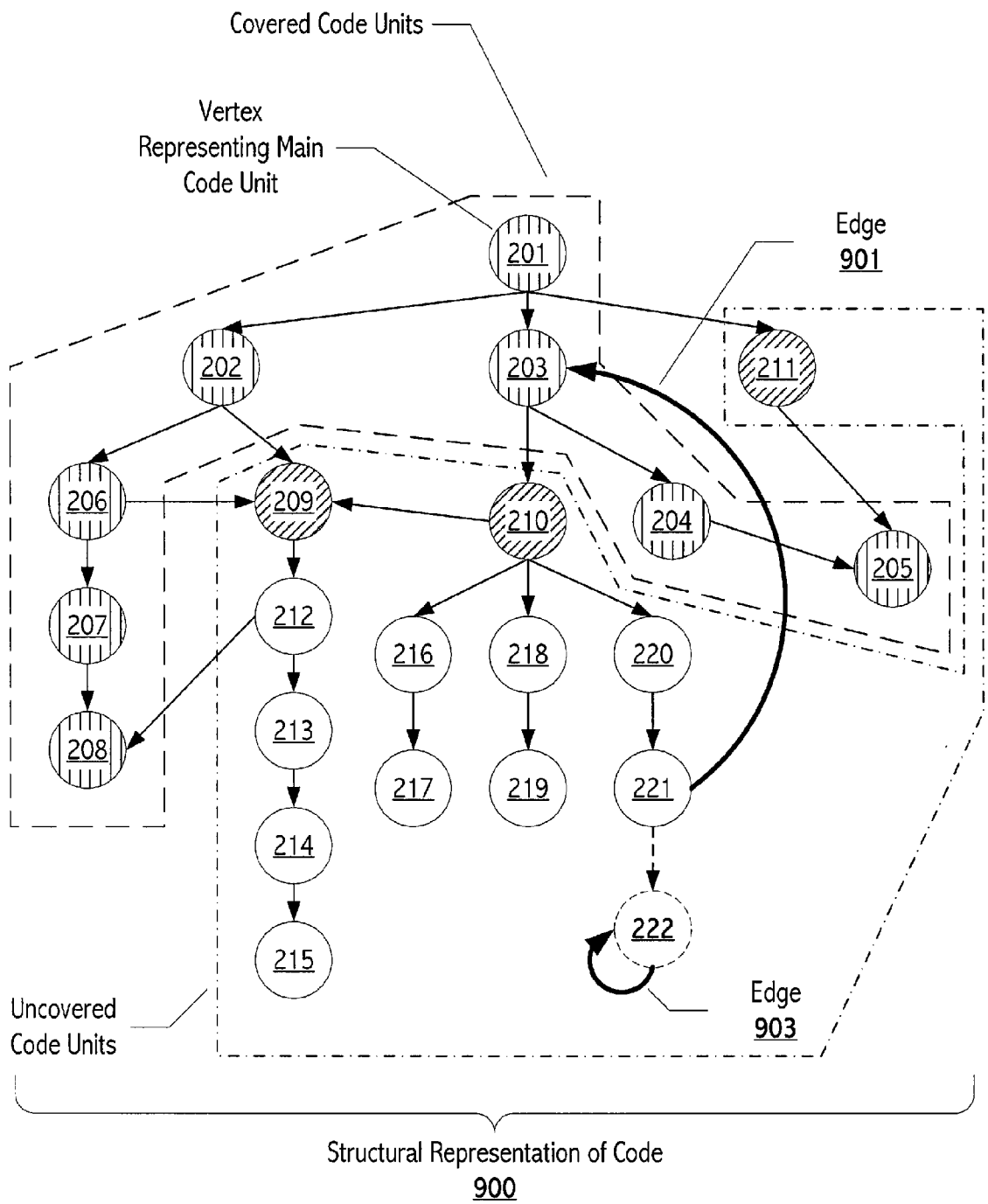
FIG. 9 depicts an example structural representation.

FIG. 9 depicts an example structural representation. A structural representation 900 is the same as the structural representation 200 of FIG. 2, with the exception of an indication of recursive flow. An edge 901 represents a call to the code units represented by the vertex 203 from the code unit represented by the code unit 203. Since the vertex 203 represents a covered code unit, the vertex 203 is not included in the computation of potential coverage value for the code represented by the uncovered root-level vertex 210.

During identification or after identification, associations are made between the code units and the individual code unit measurement values. Code unit measurement values may be measured with various metrics (e.g., number of basic blocks, number of instruction instances, code size (e.g., number of bits), etc.). In one example, a graph representation accommodates individual measurement values in the structures that correspond to vertices. In this example, during traversal for identification (or in a subsequent traversal), as each vertex is visited, an individual measurement value for the code unit represented by the visited vertex is looked up (e.g., in a data structure, in a hardware table, CAM, etc.) and indicated in the vertex. In another example, a reference is added to the vertex to point to the address space or hardware table that hosts the individual measurement value. In another example, as each vertex is visited, the structure that indicates the individual measurement value for a code unit is updated to indicate coverage classification (i.e., covered, root level uncovered, non-root level uncovered), and to indicate child set for the code unit. In another example, only uncovered code units are associated with their measurement values. Various techniques may be employed to perform traversal of a graph representation to identify root level code units (e.g., breadth-first-search, depth-first-search, etc.).

After or during identification of the root level uncovered code units, potential coverage values for the root level uncovered code units are computed. The potential coverage value for a code unit includes the code unit's individual measurement value and the measurement values of any child uncovered code units (i.e., non-root level uncovered code units having either direct or indirect control flow from a root level uncovered code unit). As with the identification, computation of the potential coverage values can be implemented with various techniques. Likewise, various structures are also available to be employed to indicate the potential coverage values, individual measurement value, control flow, and/or coverage status of code units.

FIG. 4 depicts a flow for an example function to compute potential coverage values. FIG. 4 depicts an example function COMPUTE_POTENTIAL that takes an input parameter VERTEX and returns an integer (assuming the code coverage metric can be conveyed with an integer value). It is assumed that the VERTEX is of a type vertex_struct, an example of which is as follows:

```
struct vertex_struct {
int num_direct_children=0   //number of code units receiving direct
                            //control flow
int individual_value=0      //individual measurement value
vertex_struct* child[ ]     //pointers to each child
int potential_coverage=0    //sum of child uncoverage and
individual
int visited=0               //indication of whether vertex visited
}
```

It should be appreciated that this example structure is only provided to aid in understanding the described embodiments and not meant to limit embodiments. As stated above, those of ordinary skill in the art should appreciate that variety of permutations of structures and search techniques can be employed. For instance, this example assumes that the function will be executed for each root level uncovered code unit and that the graph representation being traversed does not include vertices for covered code units. In another example, the structure that represents a code unit accommodates indication of the represented code as covered or uncovered, root-level uncovered, non-root level uncovered, etc. A conditional check would be performed on the vertices representing code units during traversal of the structural representation to verify that the vertex being visited is uncovered in the case of a graph representation that indicates both uncovered and covered code units.

The function initializes a variable child_total to zero and a variable num to the number of child nodes of the vertex being visited. The function also sets the field visited to 1 to reflect that the vertex has been visited and avoid double counting of vertices. A conditional check is performed to determine whether the currently visited vertex already has a computed potential coverage value (e.g., the potential coverage value was computed during a an predecessor traversal for a different root-level uncovered code unit). Thus, resetting and recomputing potential coverage values for subtrees can be avoided if desired. If the potential coverage value for the currently visited vertex has already been computed, then that value is returned. Otherwise, a while loop is then entered if the visited vertex has children. In the loop, a variable current_vertex is set to one of the children of the vertex currently being visited. If current_vertex has already been visited, then the individual measurement value for the current_vertex is not counted again. A recursive call is then made to the function, passing the current_vertex as input, if the visited field of the selected child indicates that the vertex has not been visited. The visited field is reset for all vertices representing uncovered code units prior to execution of the function for the next root-level uncovered code unit. The value returned by the function is added to the child_total variable. Upon return from the recursive call, the variable num is decremented. Once the loop is terminated, the potential_coverage field of the currently visited vertex is set to the sum of the individual coverage value of the code unit represented by the currently visited vertex and the value of child_total. Finally, the computed potential coverage value is returned. The function sets the potential coverage value for each vertex visited, whether root level or non-root level uncovered, to preserve the option of displaying potential coverage values for non-root level uncovered code units. However, it is not necessary to set the potential coverage value for each visited vertex. The potential coverage value for the subject root level uncovered vertex may be set with the value returned by the function.

The example function is now described with reference to FIG. 2. If the function is executed with the vertex 209, then the potential coverage value for the root level uncovered code unit represented by the vertex 209 will be the sum of the individual coverage values of the code units represented by the vertices 212-215. The vertex 208 will not be referenced by the vertex 212 because it has been removed as a child of the vertex 212 because it represents a covered code unit. In another example, the vertex 208 may be intact as a child of the vertex 212 (i.e., remains in the graph representation), but not included in the computation after it is determined that the represented code unit is covered. In addition, the computed potential coverage value for the code unit represented by the vertex 212, assuming potential coverage values are computed for non-root level code unit vertices, would be the sum of the individual coverage value of the code units represented by the vertices 212-215, for 213 the potential coverage value would be the sum of the individual coverage values indicated for vertices 213-215, and so forth. When the function is executed on the root level uncovered code unit vertex 210, the individual coverage value for the root level uncovered code unit vertex 209 is added into the sum of the individual coverage values of the non-root level uncovered code unit vertices 216-221. Hence, the covered code unit represented by the vertex 209 is included in two different computations.

Indication of uncoverage values or potential coverage values adds significant guidance for maximizing coverage of test data efficiently. Potential coverage values may guide developers to target one or more root level uncovered code units with the most substantial impact on coverage in a significantly more efficient manner than manually parsing the code. The potential coverage values may be encoded in one or more of HTML, XML, SHTML, etc., for display in a web browser; displayed in an application window according to operating system parameters; encoded in ASCII format in a text file; compressed and transmitted; etc. Without uncoverage information, a software engineer would search through a list of functions numbering at least in the thousands to identify those functions that the software engineer recognized as "important" (i.e., functions that the software engineer believes should be exercised or functions that are not exercised and that are gatekeepers to significant sections of a program) to develop tests that would exercise these "important" functions. Furthermore, the uncoverage information can be garnered with executable code (i.e., without source or object code which is typically unavailable anyway), thus avoiding recompiling of typically unavailable code.

Figure 5:
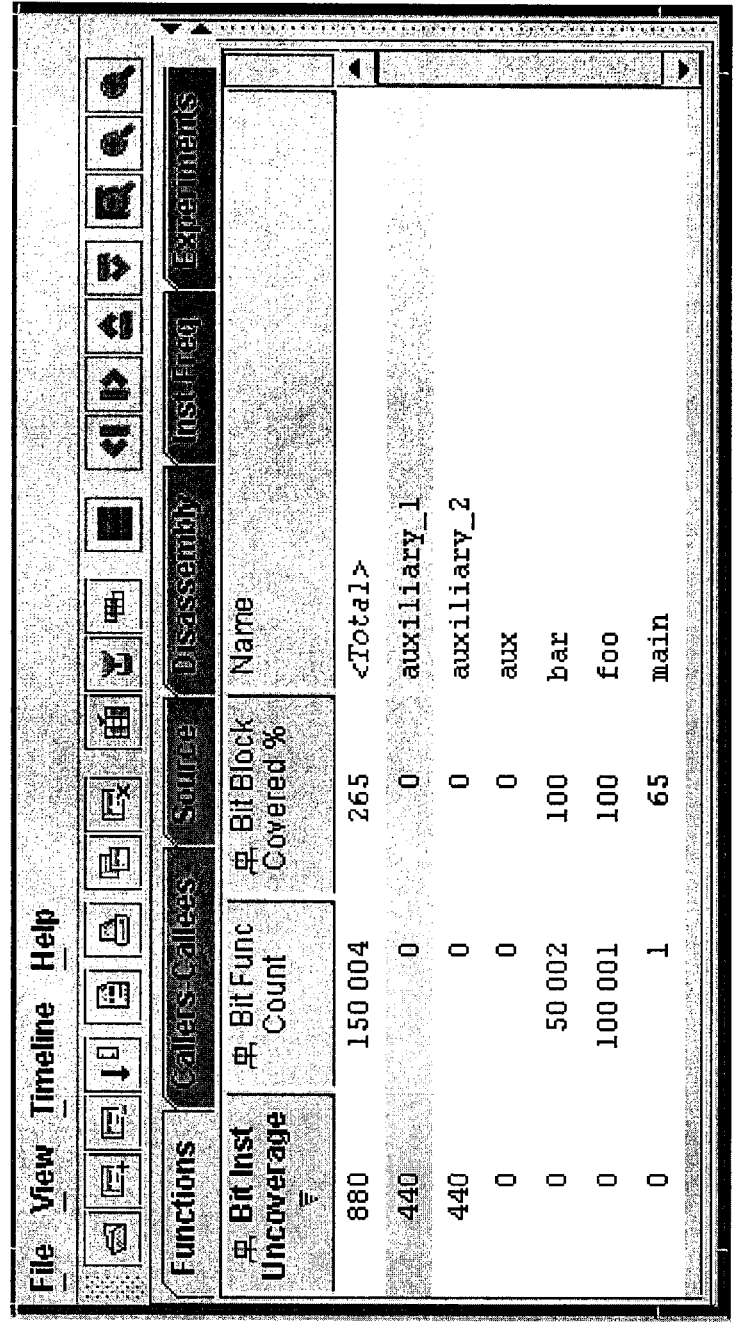
FIG. 5 depicts an example code analysis tool display.
Figure 6:
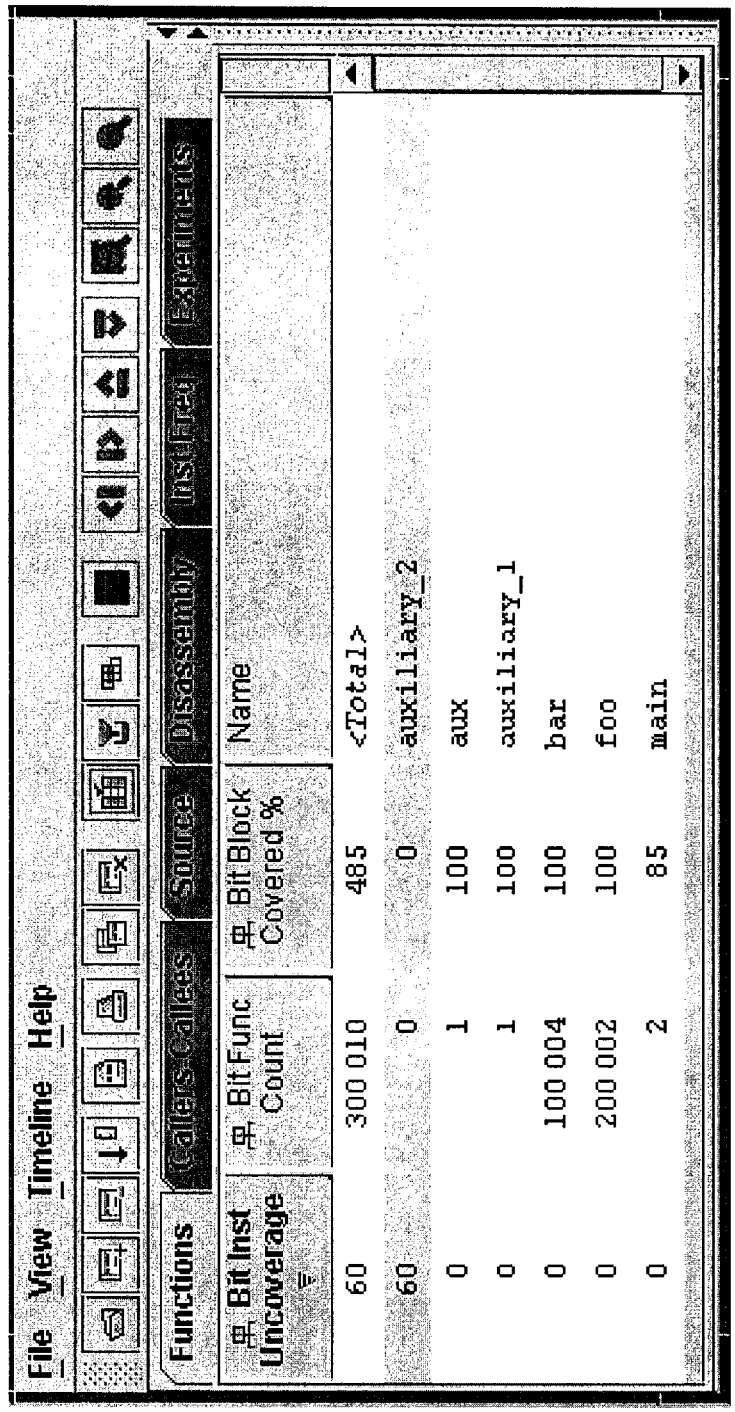
FIG. 6 depicts an example code analysis tool display.

FIGS. 5 and 6 depict example displays of uncoverage information. FIG. 5 depicts an example code analysis tool display. A code analysis tool display 500 indicates four columns of information for 5 code units and the main code. The first column indicates the number of bytes of code that could potentially be covered if test data were added to a test suite that caused a corresponding function to be called (uncoverage values or potential coverage values). The second column indicates how many times a function was called, but in the context of uncoverage analysis it only matters whether the count is zero or non-zero. If it is zero the function is not covered. If it is non-zero it is covered. If any instruction instance in a function is executed, the function is considered to be covered. A non-root level uncovered function can be detected by looking at this field. If a function's entry in the first and second columns are zero, then the corresponding function is not a root-level uncovered function, such as the function aux. Of course, the tool may be configured to display potential coverage values for non-root level uncovered functions while distinguishing between root level and non-root level with other techniques (e.g., coloring text, attach a suffix or prefix to the function name, adding a different column to display potential coverage values for non-root level functions, etc.). The third column indicates for each function the percentage of basic blocks in the function that are covered. This number gives an idea of how well the function is covered. In this example display, the percentage is for the <Total> row is the sum of percentages in the column. The entry for <Total> can be implemented to display an average, null, zero, etc. The fourth column indicates the names of the functions.

The six code units indicated are main, auxiliary_1, auxiliary_2, aux, bar, and foo. According to the displayed information, the functions main, bar and foo have been covered by a test suite.

Figure 8A:
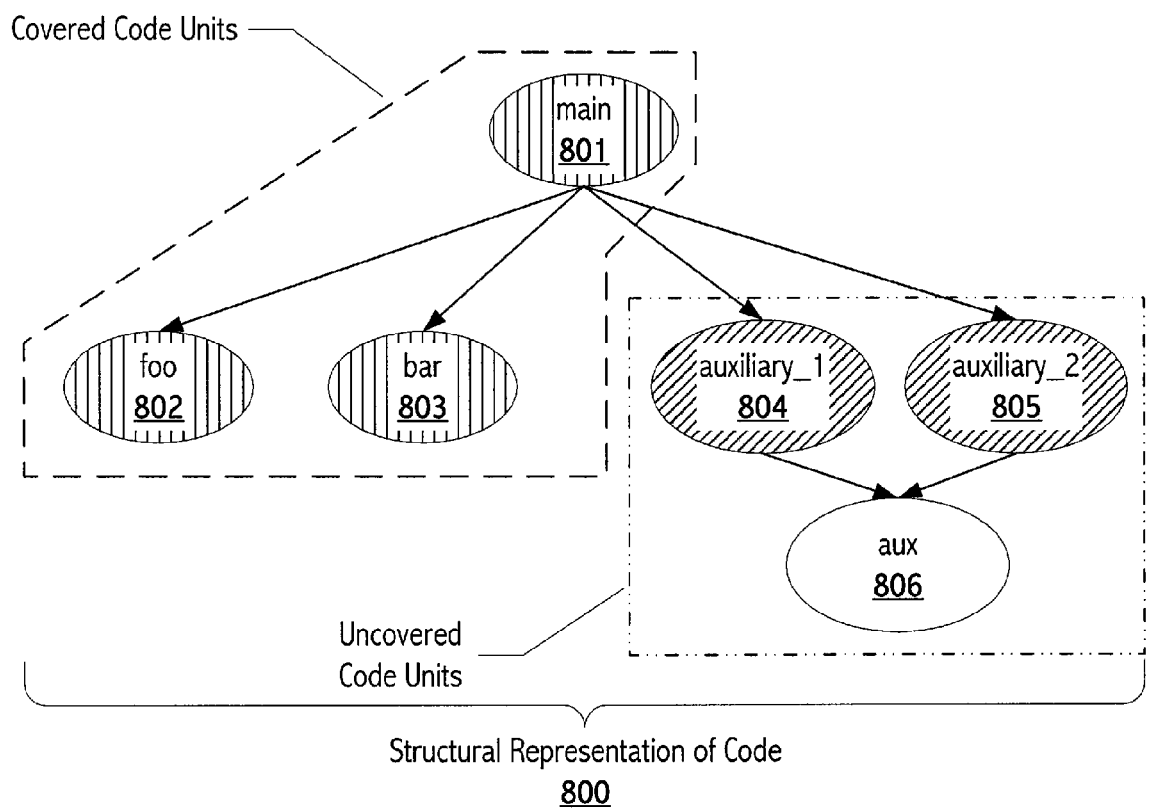
FIGS. 8A-8B depict an example representation of control flow for the example program depicted in FIGS. 5 and 6.
Figure 8B:
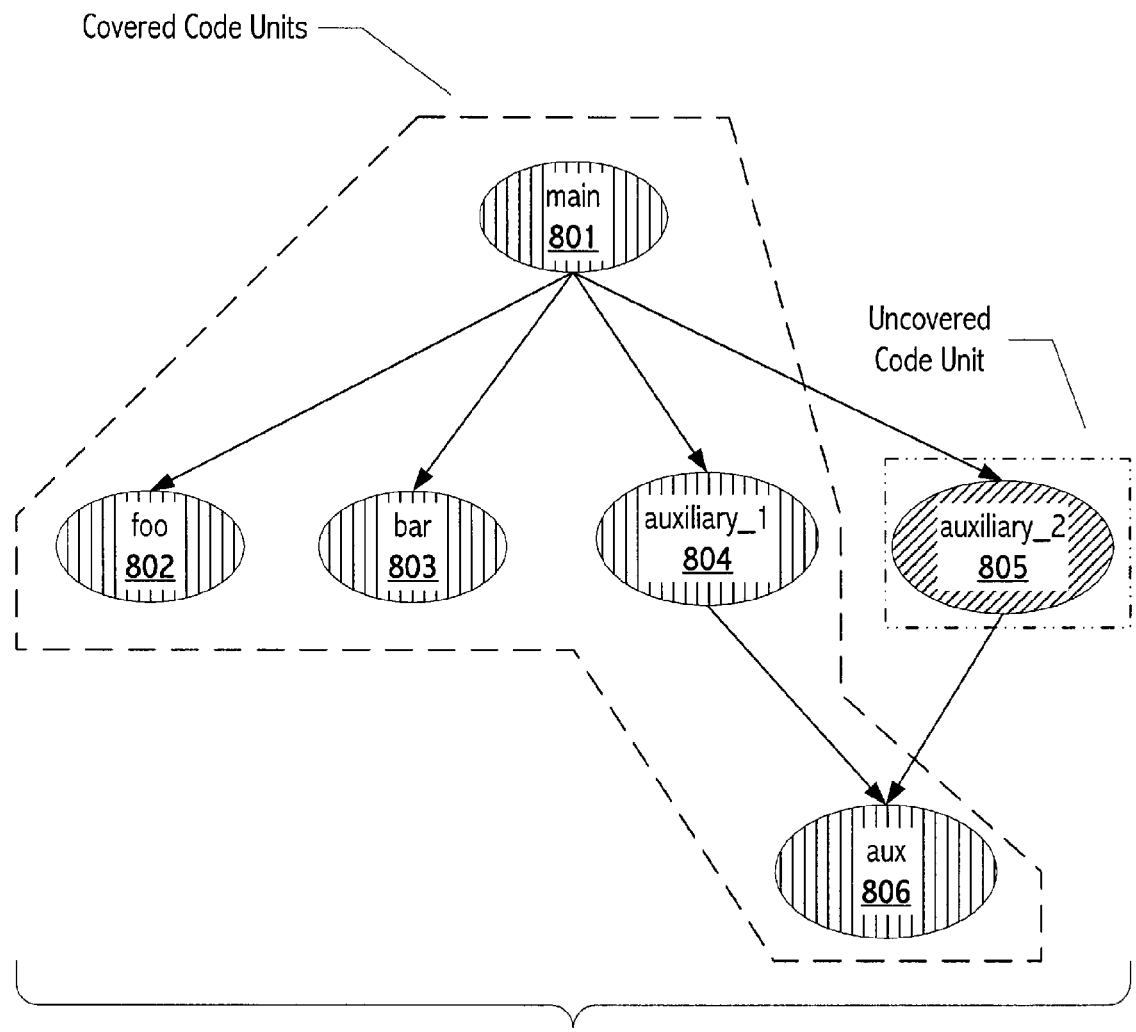

FIGS. 8A-8B depict an example representation of control flow for the example program depicted in FIGS. 5 and 6. FIG. 8A depicts an example representation of control flow that illustrates coverage corresponding to the display depicted in FIG. 5. In FIG. 8A, a structural representation 800 of main includes vertices 801-803 that represent main and the covered functions foo and bar. The vertices 804-806 respectively correspond to the uncovered functions auxiliary_1, auxiliary_2, and aux. The structural representation 800 depicts control flowing from both functions auxiliary_1 and auxiliary_2 to aux.

Referring again to FIG. 5, if test data is added to the test suite to cause auxiliary_1 to be executed, then the potential increase in coverage is 440 bytes. A modification to the test suite that causes execution of auxiliary_2 would also cause a potential increase of 440 bytes of coverage. The amount that coverage actually increases varies according to the structure of the functions. In the event that there were no branches in the function, and that all the functions called were likewise straight line functions, then coverage would indeed increase by the stated number of bytes. However, in general, the actual coverage increase may be less than the potential coverage increase. The functions with non-zero potential coverage values are root level uncovered functions (auxiliary_1 and auxiliary_2). The non-root level uncovered functions should either be covered or revealed as uncovered in subsequent passes, as the test suite is improved to cover the high-potential uncovered functions.

FIG. 6 depicts an example code analysis tool display. In FIG. 6, a display 600 indicates a result of adding one or more tests that cause execution of the function auxiliary_1. As stated in the above example, uncoverage values are non-exclusive. In this example, the two uncovered functions, auxiliary_1 and auxiliary_2, both unconditionally call the function aux.

FIG. 8B depicts an example control flow and increased coverage that corresponds to the display depicted in FIG. 6. It is assumed a test suite has been modified or added to target the function auxiliary_1. The structural representation depicts coverage of vertices 801-804 and 806.

Referring again to FIG. 6, the number of uncovered instruction instances in aux (and all uncovered functions that aux calls) are added to both auxiliary_1 and auxiliary_2. When auxiliary_1 becomes covered by adding appropriate tests, aux is also covered. Hence, the number of bytes uncovered in auxiliary_2 decreases by aux bytes, which may cause auxiliary_2 to drop down in rank with respect to potential coverage increase.

As stated above, various factors may influence the actual increase in coverage. The described embodiments assume a straight forward measurement of code units. However, various enhancements may be applied to adjust the individual measurement values and/or potential coverage values of code units based on heuristics, user defined criteria, user defined criteria and heuristics, etc. For example, the potential coverage values of code units with loops, recursive calls, etc., may be adjusted to enhance conveyed potential impact.

The described embodiments may be provided as a computer program product, or software, that may include a machine-readable medium having stored thereon instructions, which may be used to program a computer system (or other electronic device(s)) to perform a process according to embodiments of the invention, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 7:
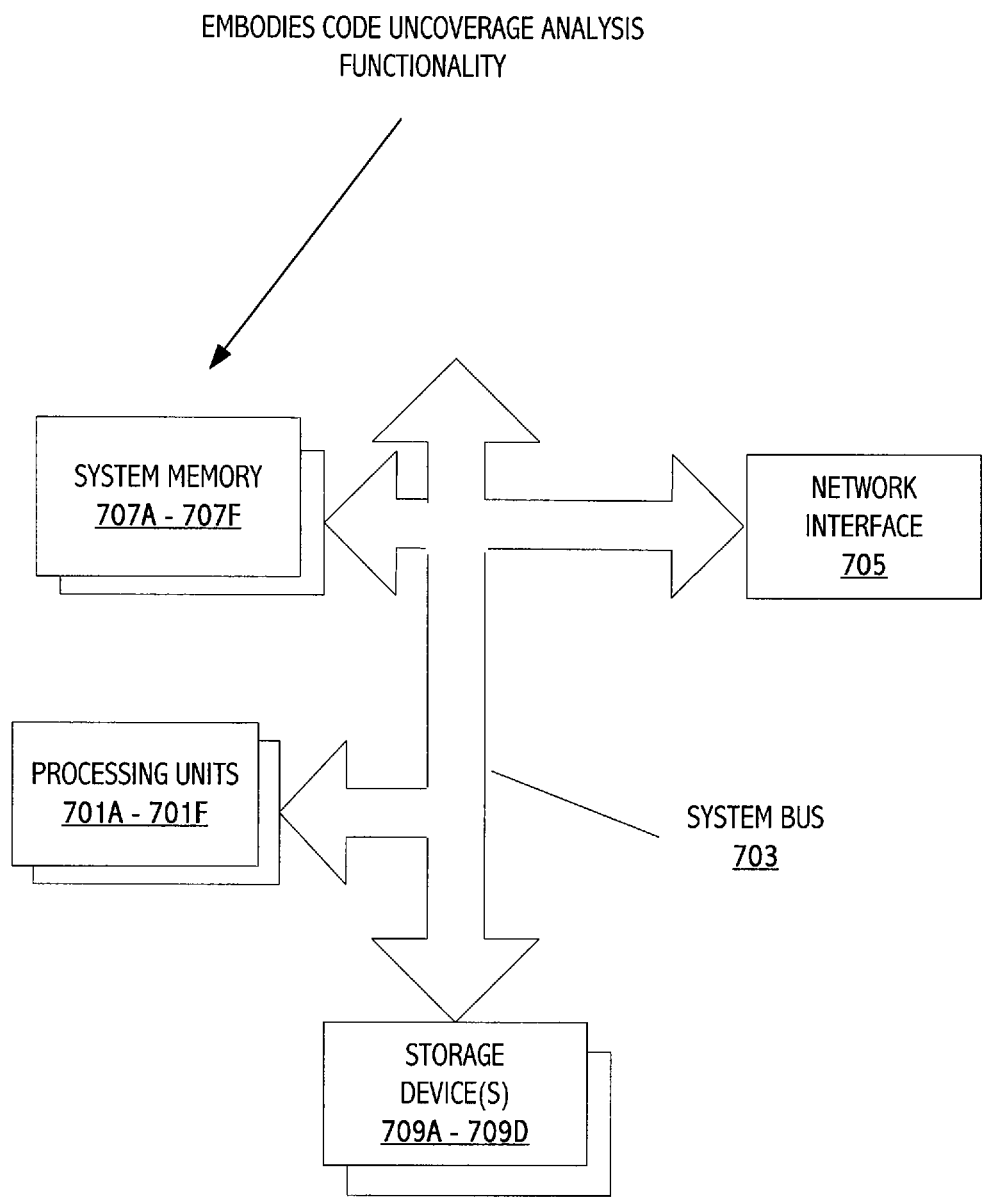
FIG. 7 depicts an example computer system.

FIG. 7 depicts an example computer system. A computer system includes a processor unit 701 (possibly including multiple processors, multiple cores, multiple nodes, and/or implementing multi-threading, etc.). The computer system includes memory 707A-707F. The memory 707A-707F may be system memory (e.g., one or more of cache, SRAM, DRAM, RDRAM, EDO RAM, DDR RAM, EEPROM, etc.) or any one or more of the above already described possible realizations of machine-readable media. The computer system also includes a bus 703 (e.g., PCI, ISA, PCI-Express, HyperTransport, InfiniBand, NuBus, etc.), a network interface 705 (e.g., an ATM interface, an Ethernet interface, a Frame Relay interface, SONET interface, etc.), and a storage device(s) 709A-709D (e.g., optical storage, magnetic storage, etc.). The system memory 707A-707F embodies a code analysis tool that generates uncoverage information. Functionality for a code analysis tool may be partially (or entirely) implemented in hardware and/or on the processing unit 701. For example, the functionality may be implemented with an application specific integrated circuit, in a coverage analysis unit in the processing unit 701, in a coverage analysis unit on a peripheral device or card, etc. Realizations may include fewer or additional components not illustrated in FIG. 7 (e.g., video cards, audio cards, additional network interfaces, peripheral devices, etc.). The processor unit 701, the storage device(s) 709A-709D, and the network interface 705 are coupled to the bus 703. The memory 707A-707F is either coupled directly or indirectly to the bus 703.

OTHER EMBODIMENTS

While the invention(s) is (are) described with reference to various implementations and exploitations, it will be understood that these embodiments are illustrative and that the scope of the invention(s) is not limited to them. In general, techniques for deriving uncoverage information for code described herein may be implemented with facilities consistent with any hardware system or hardware systems hereafter defined. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method, executed on a processor, the method comprising:
   instrumenting a code according to a profiling indication to generate profile data;
   analyzing the profile data to identify coverage data;
   examining structural information of the code and the coverage data to identify uncoverage data;
   identifying, from the coverage data and uncoverage data, one or more root level uncovered units of the code with a potential for increasing coverage of the code if the one or more root level uncovered code units are covered;
   wherein the one or more root level uncovered code units are uncovered code units that have direct control flow indicating a transition from one or more covered code units, the direct control flow comprising both potential control flow and actual control flow between the one or more code units; and
   associating a code unit measurement value with the one or more root level uncovered units of the code, the code unit measurement value corresponding to a number of instruction instances included within the one or more root level uncovered units of the code that quantifies the potential for increasing coverage of the code if the one or more root level uncovered code unite are covered.

2. The method of claim 1, further comprising:
   identifying one or more non-root level uncovered code units, wherein the non-root level uncovered code units are uncovered code units that have either direct or indirect control flow from at least one of the root level uncovered code units; and
   computing potential coverage values for the non-root level uncovered code units.

3. The method of claim 1 further comprising measuring potential coverage increase for each of the one or more uncovered code units.

4. The method of claim 3, wherein the potential for increasing coverage of the root level uncovered code units is measured based, at least in part, on number of basic blocks, and code size.

5. The method of claim 1 further comprising modifying test data or creating test data to target at least one of the one or more root level uncovered code units.

6. The method of claim 1, wherein the covered code units comprise at least one of a program, subroutines, subprograms, procedures, functions, and methods.

7. A non-transitory computer program product encoded in one or more machine-readable media, the computer program product comprising:
   a first sequence of instructions executable to instrument a code according to a profiling indication to create profile data;
   a second sequence of instructions executable to analyze the profile data to identify coverage data;
   a third sequence of instructions executable to examine structural information of the code and the coverage data to identify uncoverage data;
   a fourth sequence of instructions executable to examine the coverage data and uncoverage data to identify one or more root level uncovered code units of the program that are not covered by a set of one or more available tests and that have direct control flow indicating a transition from covered code units, the control flow comprising both potential control flow and actual control flow between the one or more code units;
   a fifth sequence of instructions executable to compute potential increased coverage impact on the program for each of the identified code units; and
   a sixth sequence of instructions executable to associate a code unit measurement value with the one or more root level uncovered code units, the code unit measurement value corresponding to a number of instruction instances included within the one or more root level uncovered code units that quantifies the potential for increasing coverage of the code if the one or more root level uncovered code unit are covered.

8. The computer program product of claim 7 further comprising a sixth sequence of instructions executable to order code units identified by the first sequence of instructions based, at least in part, on potential increased coverage impact computed by the second sequence of instructions.

9. A code analysis tool, executable on a processor, that identifies potential coverage values for uncovered units of a code based, at least in part, on a profile indication, profile data, coverage data, uncoverage data, one or more root level uncovered units of the code, wherein the one or more root level uncovered code units are uncovered code units that have direct control flow indicating a transition from one or more covered code units of the code and structural information of the code, the direct control flow comprising both potential control flow and actual control flow between the one or more code units, and wherein the code analysis tool is further configured to associate a code unit measurement value with the one or more root level uncovered units of the code, the code unit measurement value corresponding to a number of instruction instances included within the one or more root level uncovered units of the code that quantifies the potential for increasing coverage of the code if the one or more root level uncovered code unite are covered.

10. The code analysis tool of claim 9, wherein the code analysis tool computes the potential coverage values for the uncovered code units.

11. The code analysis tool of claim 10, wherein the potential coverage values correspond to at least one of potentially coverable basic blocks, potentially coverable subroutines, potentially coverable code size, and potentially coverable lines.

12. The code analysis tool of claim 9, wherein the code analysis tool generates one or more tests to cover at least one of the uncovered code units.

13. The code analysis tool of claim 12, wherein the at least one of the uncovered code units has a greatest potential coverage value.

14. The code analysis tool of claim 9, wherein the code analysis tool only displays potential coverage values for those uncovered code units having direct control flow from one or more covered code units.

15. The code analysis tool of claim 14, wherein the code analysis tool is configurable to also display potential coverage values for uncovered code units having direct control flow from one or more uncovered code units.

16. The code analysis tool of claim 9, wherein the code analysis tool orders the uncovered code units based, at least in part, on potential coverage values from greatest potential coverage to least potential coverage.

* * * * *

UNITED STATES PATENT AND TRADEMARK OFFICE
CERTIFICATE OF CORRECTION

PATENT NO. : 9,021,446 B2
APPLICATION NO. : 11/427259
DATED : April 28, 2015
INVENTOR(S) : Prakash et al.

Page 1 of 1

It is certified that error appears in the above-identified patent and that said Letters Patent is hereby corrected as shown below:

In the specification

Column 5, line 35, delete "a an" and insert -- a --, therefor.

Signed and Sealed this
Ninth Day of February, 2016

Michelle K. Lee
*Director of the United States Patent and Trademark Office*